(12) United States Patent
Takeda (10) Patent No.: US 10,082,571 B2
(45) Date of Patent: Sep. 25, 2018

(54) MONITORING APPARATUS (71) Applicant: NIDEC ELESYS CORPORATION, Kawasaki-shi, Kanagawa (JP)

(72) Inventor: Naoya Takeda, Kawasaki (JP)

(73) Assignee: NIDEC ELESYS CORPORATION, Kanagawa (JP)

(*) Notice: Subject to any disclaimer, the term of this patent is extended or adjusted under 35 U.S.C. 154(b) by 359 days.

(21) Appl. No.: 14/862,456

(22) Filed: Sep. 23, 2015

(65) Prior Publication Data
US 2016/0091602 A1 Mar. 31, 2016

(30) Foreign Application Priority Data

Sep. 30, 2014 (JP) ................................. 2014-201514
Sep. 16, 2015 (JP) ................................. 2015-183189

(51) Int. Cl.
*G01S 13/86* (2006.01)
*G01S 13/93* (2006.01)
*G01S 7/02* (2006.01)

(52) U.S. Cl.
CPC .......... *G01S 13/867* (2013.01); *G01S 13/931* (2013.01); *G01S 2007/027* (2013.01)

(58) Field of Classification Search
CPC .................. G01S 13/867; G01S 13/931; G01S 2013/9392; G01S 2007/027; B60R 11/04; B60R 2300/8093
See application file for complete search history.

(56) References Cited

U.S. PATENT DOCUMENTS

| 8,604,968 | B2 | 12/2013 | Alland et al. | |
| 2011/0163904 | A1* | 7/2011 | Alland | B60R 1/00 |
| | | | | 342/1 |
| 2014/0118179 | A1* | 5/2014 | Alland | G01S 7/025 |
| | | | | 342/22 |
| 2014/0159942 | A1* | 6/2014 | Shi | G01S 13/867 |
| | | | | 342/55 |
| 2014/0293264 | A1* | 10/2014 | Miyazaki | G01C 3/08 |
| | | | | 356/4.01 |

(Continued)

FOREIGN PATENT DOCUMENTS

| CN | 102956969 A | 3/2013 |
| JP | 2009-107393 A | 5/2009 |

(Continued)

*Primary Examiner* — Peter M Bythrow
*Assistant Examiner* — Daniel P Malley, Sr.
(74) *Attorney, Agent, or Firm* — Keating & Bennett, LLP (57) ABSTRACT

A monitoring apparatus includes an image-forming optical system aimed forward, an image sensor, an antenna, a first circuit board, a waveguide, an upper case, an information-processing circuit, a second circuit board, a connector, and a power-supply circuit. The connector is disposed at a rear side relative to the image-forming optical system. The power-supply circuit includes at least one capacitor, and a capacitor that is positioned at a highest location out of all of the at least one capacitor is disposed at a rear side relative to the image-forming optical system, which prevents the capacitor from obstructing the visual field of the image-forming optical system. Thus, the image-forming optical system is able to be located close to the power-supply circuit because the monitoring apparatus is very small in height.

4 Claims, 7 Drawing Sheets

(56) References Cited

U.S. PATENT DOCUMENTS

| | | | | |
|---|---|---|---|---|
| 2015/0207217 A1* | 7/2015 | Fujita | ............... | H01Q 1/3233 |
| | | | | 343/872 |
| 2015/0229023 A1* | 8/2015 | Abe | ............ | H01Q 13/02 |
| | | | | 342/368 |
| 2016/0093944 A1* | 3/2016 | Kamo | ............... | H01Q 1/3266 |
| | | | | 348/148 |

FOREIGN PATENT DOCUMENTS

| | | |
|---|---|---|
| JP | 2013-246324 A | 12/2013 |
| JP | 2015-120492 A | 7/2015 |
| WO | 2006/035510 A1 | 4/2006 |
| WO | 2010/042483 A1 | 4/2010 |
| WO | 2013/146352 A1 | 10/2013 |

\* cited by examiner

MONITORING APPARATUS

BACKGROUND OF THE INVENTION

1. Field of the Invention

The present invention relates to a monitoring apparatus and more specifically to a monitoring apparatus which is included in a vehicle.

2. Description of the Related Art

In recent years, apparatuses that use both signals from radar and image information acquired from an imaging apparatus have been developed as monitoring apparatuses for monitoring a front or a rear of a vehicle. In such apparatuses, radar is often disposed in a tip portion of the exterior of an automobile whereas an imaging apparatus is disposed inside its compartment.

In contrast, for example, Japanese Domestic Re-Publication of PCT International Application No. 2006/035510 discloses a monitoring apparatus that is disposed inside a vehicle and has both a radar and an imaging apparatus. Such an apparatus does not need waterproof measures and the like for the radar. In addition, a process of assembling the radar to an automobile is simplified.

However, an apparatus including both a radar having a transmitting/receiving antenna for radar waves and an imaging apparatus having an image-forming optical system and an image sensor is difficult to downsize. Japanese Domestic Re-Publication of PCT International Application No. 2006/035510 discloses a configuration in which a radar and an imaging apparatus are horizontally disposed, which has a large horizontal width. It is often determined that a monitoring apparatus should be disposed at the upper portion of a windshield, but an apparatus having a large horizontal width may obstruct the view of a driver.

SUMMARY OF THE INVENTION

Preferred embodiments of the present invention provide a downsized monitoring apparatus which is able to alleviate the above-described problems in the prior art.

A monitoring apparatus according to a preferred embodiment of the present invention includes an image-forming optical system aimed forward; an image sensor disposed at a focus of the image-forming optical system; an antenna member including an antenna including a main lobe that extends forward; a radio frequency circuit; a first circuit board including the radio frequency circuit thereon; a waveguide connecting an output end of the radio frequency circuit and the antenna; an upper case positioned above the antenna member and including a flat portion; an information-processing circuit; a second circuit board including the information-processing circuit thereon; a radio frequency circuit signal line connecting the radio frequency circuit to the information-processing circuit; an image signal line connecting the image sensor to the information-processing circuit; a connector electrically connected to the second circuit board; and a power-supply circuit providing DC power to the information-processing circuit and the radio frequency circuit, wherein the flat portion of the upper case is inclined in a direction in which the flat portion approaches a central axis of the main lobe of the antenna member as the flat portion approaches a front end of the upper case, the second circuit board is disposed between the upper case and the antenna member, the upper case includes, in the middle or a rear of the flat portion, a visual field window that is a notch or a hole, an optical axis of the image-forming optical system passes through the visual field window, the image-forming optical system is fixed to the upper case, the flat portion is positioned below a visual field of the image-forming optical system, the connector is disposed at a rear side relative to the image-forming optical system, the power-supply circuit includes at least one capacitor, and a capacitor that is positioned at a highest location out of all of the at least one capacitor is disposed at a rear side relative to the image-forming optical system.

According to a preferred embodiment in accordance with the present invention, it is possible to obtain a monitoring apparatus capable that is greatly reduced in size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described while referring to the accompanying drawings.

It should be noted that drawings referred to in the following description may show characterizing portions in an enlarged view, as a matter of convenience, for the purpose of emphasizing the portions. Accordingly, dimensional ratios and the like of each constituent element are not necessarily the same as the actual dimensional ratios and the like thereof. In addition, for the same purpose, the drawings may be illustrated with non-characterizing portions excluded.

An X-Y-Z coordinate system is shown in each drawing. In the following description, each direction will be discussed as necessary, according to each coordinate system.

The monitoring apparatus 100 according to the present preferred embodiment is preferably, for example, an apparatus which radiates millimeter radar waves. The monitoring apparatus 100 is installed so as to be aimed in the front (or back) direction of a vehicle, for example, to detect objects ahead (or behind) of the vehicle.

Figure 1:
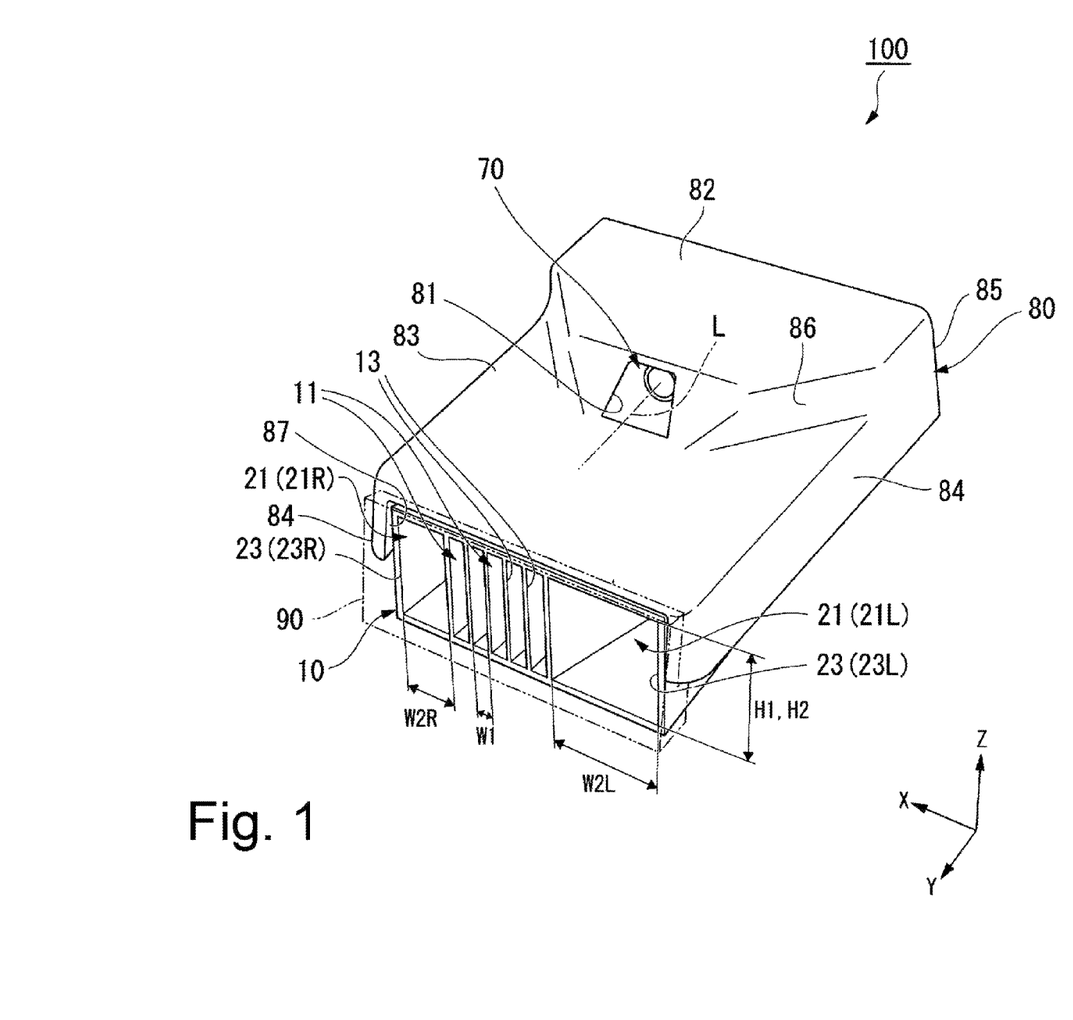
FIG. 1 illustrates a perspective view illustrating the external configuration of a monitoring apparatus of a preferred embodiment of the present invention.

FIG. 1 is a perspective view illustrating the external configuration of the monitoring apparatus 100 of the present preferred embodiment. Note that in FIG. 1, a front cover (cover) 90 is shown by a single-dot chain line for the sake of description of each constituent element.

Figure 2:
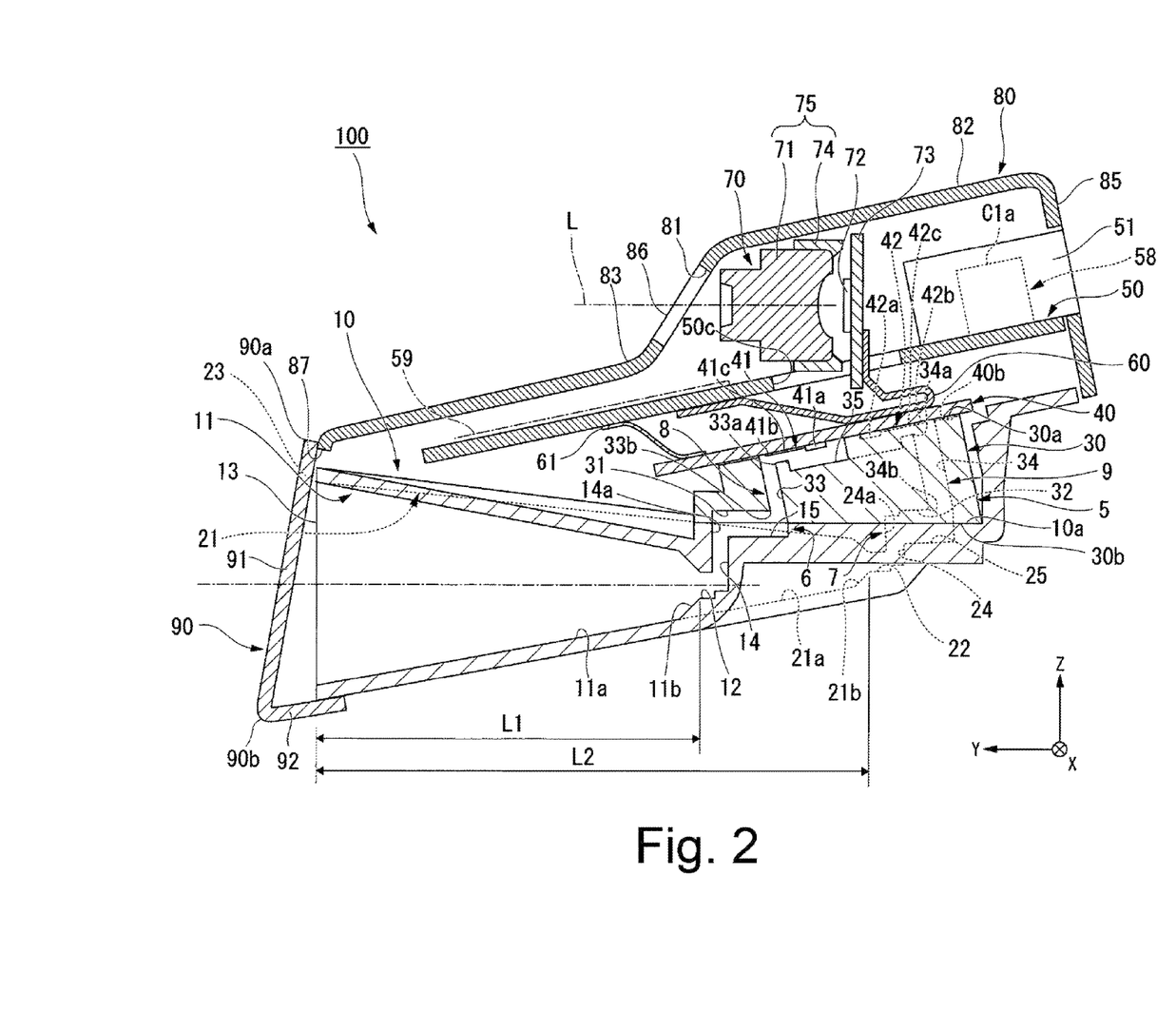
FIG. 2 illustrates a schematic cross-sectional view of the monitoring apparatus of a preferred embodiment of the present invention.

FIG. 2 is a schematic cross-sectional view of the monitoring apparatus 100 according to a preferred embodiment of the present invention. Note that FIG. 2 is a drawing schematically illustrated by, for example, partially enlarging the drawing to describe each constituent element. Also note that FIG. 2 is a cross-sectional view taken by selecting, as appropriate, a cross-section along a proper plane passing through portions to be described, rather than a cross-section along a single plane, in order to show the portions in an easy-to-understand manner.

As illustrated in FIGS. 1 and 2, the monitoring apparatus 100 preferably includes an antenna member 10; a feed member 30; a first circuit board 40; a second circuit board 50; an imaging apparatus 70; an upper case 80; and a front cover (cover) 90.

The antenna member 10 is preferably provided with first-type horns 11 and second-type horns 21. The feed member 30 is fitted on an upper surface 10a of the antenna member 10. The first circuit board 40 is fitted on the feed member 30 and on an upper surface 30a thereof. The second circuit board 50 is preferably located above the first circuit board 40 and connected to the first circuit board 40 preferably by a radio frequency circuit signal line 61. The imaging apparatus 70 is located above the second circuit board 50. The upper case 80 covers the antenna member 10 from above, thus covering components disposed on the antenna member 10. The front cover 90 covers the front side of the antenna member 10.

The antenna member 10 and the feed member 30 define a feed portion 5. The feed portion 5 includes first-type waveguides 8 and second-type waveguides 9. For ease of explanation, each portion of the first-type horn and the second-type horn will be referred to as "first-type (name of portion)" or "second-type (name of portion)," as described above.

The monitoring apparatus 100 guides radar waves (radio frequency electromagnetic waves) output by a second-type radio frequency circuit 42 on the first circuit board 40 through the second-type waveguides 9 and radiates the waves from the second-type horns 21 of the antenna member 10. In addition, the monitoring apparatus 100 captures radar waves reflecting on a detecting object with the first-type horns 11, guides the radar waves through the first-type waveguides 8, and receives the radar waves with a first-type radio frequency circuit 41 on the first circuit board 40.

Note that in the following description, a +Y direction and a −Y direction in FIG. 1 that are directions in which radar waves are transmitted by the antenna member 10 are defined as a forward direction and a backward direction, respectively. In addition, a +X direction, a −X direction, a +Z direction, and a −Z direction in FIG. 1 when the monitoring apparatus 100 is faced in the forward direction (+Y direction) are defined as a rightward direction, a leftward direction, an upward direction, and a downward direction, respectively.

Also note that each direction does not necessarily represent the direction of the monitoring apparatus 100 of the present preferred embodiment when the monitoring apparatus is mounted on a vehicle. Accordingly, for example, the monitoring apparatus 100 can be assembled into a vehicle with the apparatus turned upside down.

In addition, the term a "forward direction" herein means a direction in which the monitoring apparatus 100 performs monitoring. The term a "forward direction" does not mean the forward direction of an automobile or the like in which the monitoring apparatus 100 is installed. The monitoring apparatus 100 can be installed so as to be aimed in the backward direction of an automobile. In this case, the direction in which the monitoring apparatus 100 performs monitoring is the backward direction of the automobile.

Hereinafter, constituent elements of the monitoring apparatus 100 will be described in detail.

As illustrated in FIG. 1, in the monitoring apparatus 100, a main lobe includes an antenna member that includes antennas (first-type horns 11 and second-type horns 21) extending in a forward direction.

The antenna member 10 preferably includes five first-type horns (antennas) 11 aligned side by side in the width direction (X-axis direction) thereof and defining a row in the width direction; and two second-type horns 21 positioned at the leftmost and rightmost ends of the row of the first-type horns (antennas) 11. All of the five first-type horns 11 and the two second-type horns 21 preferably face in the same direction. That is, if a direction in which one of the first-type horns faces is defined as the forward direction, then other first-type horns 11 and second-type horns 21 also face the forward direction.

The antenna member 10 is preferably made of, for example, aluminum alloy and manufactured by die-casting, for example. The antenna member 10 is able to emit or receive microwaves including millimeter waves.

In general, a horn refers to a tubular member that widens toward the leading end thereof. In the description of various preferred embodiments of the present invention, however, the term "horn" is used in a slightly different sense. Since in preferred embodiments of the present invention attention is paid to a hollow portion through which radio waves are guided, this hollow portion is referred to as the horn. Accordingly, if, for example, one block-shaped member includes three forward-widened cavities, the one member is considered to include three horns. Likewise, if three forward-widened tubes are bundled, the bundled member is considered to include three horns.

More particularly, a horn is a cavity extending from the base portion toward the aperture side thereof, where the cross-sectional area of the cavity in a plane perpendicular or substantially perpendicularly to the extension direction of the cavity continuously expands from the base portion toward the aperture. However, the horn may include a portion where the cross-sectional area is constant or decreases partially, as long as the portion has a length equal to or shorter than that of the wavelength of radio waves traveling through the horn.

Note that in the present preferred embodiment, pyramidal horns are preferably used, in particular, as the first-type horns 11 and the second-type horns 21. The aperture of a horn is expressed as an opening in some cases. In the description of various preferred embodiments of the present invention, however, the expression "aperture" is used to refer to the radio emission port of the horn. The term "opening" will be used to describe a hole or cavity provided in members other than horns.

The direction in which a horn faces refers to a direction in which the aperture is viewed from the base portion of the horn.

In general, an antenna often refers to the entirety of an apparatus that receives or transmits electromagnetic waves. However, in the description of preferred embodiments of the present invention, an antenna refers to a portion that emits, to the outside thereof, electromagnetic waves transmitted from a waveguide or a portion that transmits, to a waveguide, electromagnetic waves from the outside thereof. In particular, in the present preferred embodiment, an antenna refers to horns as hollows extending from the base portion to the aperture (the first-type horns 11 or the second-type horns 21).

Each first-type horn 11 defines and functions as an antenna that receives radar waves.

As illustrated in FIG. 2, each first-type horn 11 is preferably a pyramidal horn having a pyramidal shape in which the horn gradually widens from a base portion 12 to an aperture 13 thereof. The length from the base portion 12 to the aperture 13 of the first-type horn 11 is a first-type length L1.

The respective apertures 13 of the five first-type horns 11 are disposed on the same plane in the anteroposterior direction of the horns. Since the five first-type horns 11 preferably have the same first-type length L1, the respective base portions 12 are also disposed on the same plane in the anteroposterior direction of the horns.

The first-type horn 11 includes a steep slope portion 11b that is positioned on the base portion 12 side along a length direction and a gentle slope portion 11a that is positioned closer to the aperture 13 side than the steep slope portion 11b. The steep slope portion 11b preferably has a large angle of inclination with respect to the length direction of the first-type horn 11 as compared to the gentle slope portion 11a. In addition, the steep slope portion 11b is provided in an area that is sufficiently small relative to a first-type length L1 of the first-type horn 11.

As illustrated in FIG. 1, the apertures 13 of the five first-type horns 11 preferably have the same or substantially the same shape. That is, the apertures 13 of the five first-type horns 11 preferably have the same or substantially the same first-type height H1. In addition, the apertures 13 of the five first-type horns 11 preferably have the same or substantially the same first-type width W1. Each aperture 13 has a vertically long rectangular transverse cross-sectional shape in which the first-type height H1 is greater than the first-type width W1.

The five first-type horns 11 are disposed in the width direction thereof, so as to be mutually complementary, thus enhancing the performance of radar wave reception. Note that the number of first-type horns 11 is not limited to five, but may be one or more than one. The number of first-type horns is preferably equal to or greater than three. This quantity makes it possible to ensure reception performance. In addition, since the first-type horns 11 are disposed side by side in the width direction, it is possible to reduce the height dimension of the monitoring apparatus 100 as a whole.

Each second-type horn 21 defines and functions as a portion of an antenna that transmits radar waves.

As illustrated in FIG. 1, the second-type horns 21 are positioned on the left and right of a row of the first-type horns 11. When the second-type horns 21 are described by distinguishing between the horns positioned on the left and right, the horn positioned on the right-hand side (+X side) of the row of the first-type horns 11 is referred to as a rightmost horn 21R, whereas the horn positioned on the left-hand side (−X side) is referred to as a leftmost horn 21L.

As illustrated in FIG. 2, each second-type horn 21 is preferably a pyramidal horn having a pyramidal shape in which the horn gradually widens from a base portion 22 to an aperture 23 thereof. The length from the base portion 22 to the aperture 23 of the second-type horn 21 is expressed as a second-type length L2. Note that the rightmost horn 21R and the leftmost horn 21L may differ in length. The second-type horns 21 are described here, however, assuming that the horns have the same second-type length L2.

The second-type length L2 of the second-type horns 21 is preferably greater than the first-type length L1 of the first-type horns 11.

The second-type horn 21 includes a steep slope portion 21b that is positioned on the base portion 22 side along a length direction and a gentle slope portion 21a that is positioned closer to the aperture 23 side than the steep slope portion 21b. The steep slope portion 21b has a large angle of inclination with respect to the length direction of the second-type horn 21 as compared to the gentle slope portion 21a. In addition, the steep slope portion 21b is provided in an area that is sufficiently small relative to a first-type length L2 of the second-type horn 21.

As illustrated in FIG. 1, the aperture 23R of the rightmost horn 21R and the aperture 23L of the leftmost horn 21L have the same second-type height H2. In addition, the second-type height H2 is the same as the first-type height H1.

A width W2R of the aperture 23R of the rightmost horn 21R is preferably smaller than a width W2L of the aperture 23L of the leftmost horn 21L. The aperture 23R of the rightmost horn 21R has a vertically long rectangular transverse cross-sectional shape whose height H2 is greater than the width W2R. On the other hand, the aperture 23L of the leftmost horn 21L has a transverse cross-sectional shape close to a square whose height H2 is or substantially is the same as the width W2L.

The orientation of the rightmost horn 21R and the orientation of the leftmost horn 21L may differ in elevation and depression angles (or elevation angle or depression angle) from each other. For example, the orientation of the rightmost horn 21R may be directed more downward than the orientation of the leftmost horn 21L. In this case, the rightmost horn 21R emits radar waves toward objects located on places of a road relatively close to a vehicle mounted with the monitoring apparatus 100 to detect the objects. On the other hand, the leftmost horn 21L detects objects located on places of the road distant from the vehicle, relatively tall objects and the like.

The apertures 23 of the two second-type horns 21 are disposed on the same plane in the anteroposterior direction of the horns.

Likewise, in the present preferred embodiment, the apertures 23 of the second-type horns 21 and the apertures 13 of the first-type horns 11 are disposed on the same plane in the anteroposterior direction of the horns.

As illustrated in FIG. 2, first-type lower holes 14 extending vertically upward with respect to the orientation of the first-type horns 11 from the respective base portions 12 of the first-type horns 11 are provided in the antenna member 10. Five first-type lower holes 14 are preferably provided in respective correspondence with the five first-type horns 11. The first-type lower holes 14 define openings 14a on the upper surface 10a of the antenna member 10.

Likewise, second-type lower holes 24 extending vertically upward with respect to the orientation of the second-type horns 21 from the base portions 22 of the second-type horns 21 are provided in the antenna member 10. Two second-type lower holes 24 are preferably provided in respective correspondence with the two second-type horns 21. The second-type lower holes 24 define openings 14a on the upper surface 10a of the antenna member 10.

The upper surface 10a of the antenna member 10 is parallel or substantially parallel to the width and length directions of the first-type horns 11 and the second-type horns 21. In addition, the upper surface 10a is vertical or substantially vertical to the first-type lower holes 14 and the second-type lower holes 24.

A first-type lower groove 15 that extends continuously from the opening 14a of a first-type lower hole 14 is preferably provided on the upper surface 10a of the antenna member 10. In addition, second-type lower grooves 25 extending continuously from the openings 24a of the second-type lower holes 24 are provided in the upper surface 10a of the antenna member 10. Five first-type lower grooves 15 are preferably provided in respective correspondence with the first-type lower holes 14. Two second-type lower grooves 25 preferably are provided in respective correspondence with the second-type lower holes 24.

The first-type lower grooves 15 define portions of the first-type waveguides 8 along with the first-type upper grooves 31 of the feed member 30 to be described later. Likewise, the second-type lower grooves 25 define portions of the second-type waveguides 9 along with the second-type upper grooves 32 of the feed member 30.

As illustrated in FIG. 2, the feed member 30 is preferably fitted on the upper surface 10a at the rear of the antenna member 10. The feed member 30 has a block-shaped configuration and is preferably made of an aluminum alloy. The feed member 30 can preferably be manufactured by die-casting or cutting work, for example. The feed member 30 preferably includes a lower surface 30b positioned on the lower side of the feed member and an upper surface 30a positioned on the upper side of the feed member. The upper surface 30a and the lower surface 30b are not parallel to each other, i.e., the upper surface 30a is inclined so that a vertical position of the front end is lower than that of the rear end, when the lower surface 30b is held horizontally.

Five first-type upper holes 33 and two second-type upper holes 34 are preferably provided in the feed member 30. The first-type upper holes 33 and the second-type upper holes 34 penetrate through the upper surface 30a and the lower surface 30b of the feed member 30. The first-type upper holes 33 and the second-type upper holes 34 are arranged vertically to the upper surface 30a.

The first-type upper groove 31 that extends from an opening 33b of the first-type upper hole 33 is provided on the lower surface 30b of the feed member 30. In addition, the second-type upper groove 32 that extends from an opening 34b of the second-type upper hole 34 is provided on the lower surface 30b of the feed member 30.

The feed member 30 is in contact with the upper surface 10a of the antenna member 10 on the lower surface 30b. The first-type lower grooves 15 provided in the upper surface 10a of the antenna member 10 face the first-type upper grooves 31 provided in the lower surface 30b of the feed member 30. The first-type lower grooves 15 and the first-type upper grooves 31 are shaped to be reflectively symmetrical to each other. As illustrated in FIG. 2, the first-type lower grooves 15 and the first-type upper grooves 31 lie on top of each other while facing each other, thus defining tunnel-like first-type relay holes 6 in the boundary between the feed member 30 and the antenna member 10.

Likewise, the second-type lower grooves 25 and the second-type upper grooves 32 are preferably shaped to be reflectively symmetrical to each other. The second-type lower grooves 25 and the second-type upper grooves 32 lie on top of each other while facing each other, thus constituting second-type relay holes 7.

The openings 33a of the first-type upper holes 33 and the openings 34a of the second-type upper holes 34 are positioned on the upper surface 30a of the feed member 30. In addition, a concave portion 35 is provided on the upper surface 30a of the feed member 30. The concave portion 35 is continuous to the openings 33a and the openings 34a. The concave portion 35 is substantially similar in shape to a radio frequency circuit region 45 of the first circuit board 40 to be described later, though slightly larger than the board.

As illustrated in FIG. 2, the monitoring apparatus 100 includes radio frequency circuits (a first-type radio frequency circuit 41 and a second-type radio frequency circuit 42) and the first circuit board 40 which includes the radio frequency circuits (a first-type radio frequency circuit 41 and a second-type radio frequency circuit 42) thereon. In addition, the monitoring apparatus 100 includes waveguides a first-type waveguide 8 and a second-type waveguide 9) that connect the output ends of the radio frequency circuits (the first-type radio frequency circuit 41 and the second-type radio frequency circuit 42) and antennas (the first-type horns 11 and the second-type horns 21).

The first circuit board 40 is preferably fixed on the upper surface 30a of the feed member 30. Consequently, the surface of the first circuit board 40 extends in a direction in which the first-type horns 11 and the second-type horns 21 extend and in the width direction thereof.

Fixed holes (not illustrated) are preferably provided in the first circuit board 40 and the feed member 30. In addition, screw holes (not illustrated) are preferably provided in the antenna member 10. The first circuit board 40 and the feed member 30 are fixed by inserting screws (not illustrated) made to penetrate through the fixing holes of the first circuit board 40 and the fixing holes of the feed member 30 into the screw holes of the antenna member 10.

In the present preferred embodiment, the first circuit board 40 and the feed member 30 are disposed on the upper side of the antenna member 10. The first circuit board 40 and the feed member 30 may be disposed on the lower side of the antenna member 10, however.

The first-type radio frequency circuit 41 that receives radar waves, and the second-type radio frequency circuit 42 that transmits radar waves are mounted on the first circuit board 40.

The first-type radio frequency circuit 41 preferably includes a radio frequency integrated circuit 41a, and five transmission channels (microstriplines) 41c extending from the radio frequency integrated circuit 41a and including receiving ends 41b at the leading ends of the channels.

Likewise, the second-type radio frequency circuit 42 includes a radio frequency integrated circuit 42a, and two transmission channels (microstriplines) 42c extending from the radio frequency integrated circuit 42a and including transmitting ends 42b at the leading ends of the channels.

As illustrated in FIG. 2, the receiving ends 41b of the first-type radio frequency circuit 41 are preferably positioned above the openings 33a of the first-type upper holes 33 of the feed member 30. Electromagnetic waves propagating from the first-type upper holes 33 are received at the receiving ends 41b.

Likewise, the transmitting ends 42b of the second-type radio frequency circuit 42 are preferably positioned above the openings 34a of the second-type upper holes 34 of the feed member 30. Electromagnetic waves from the radio frequency integrated circuit 42a are transmitted from the transmitting ends 42b to the second-type upper holes 34.

Next, a description will be made of the feed portion 5 including the first-type waveguides 8 and the second-type waveguides 9, which are the transmission paths of transmitted and received radar waves, and include the antenna member 10 and the feed member 30.

The feed portion 5 is defined of the feed member 30 including the upper surface 30a and the lower surface 30b and the antenna member 10 including the upper surface 10a. The feed portion 5 preferably includes the five first-type waveguides 8 that guide received radar waves and the two second-type waveguides 9 that guide transmitted radar waves.

In addition, the feed portion 5 covers the first-type radio frequency circuit 41 and the second-type radio frequency circuit 42 on the upper surface 30a of the feed member 30.

The first-type waveguide 8 is preferably defined by the first-type lower hole 14, the first-type relay hole 6, and the first-type upper hole 33. The second-type waveguide 9 is preferably defined by the second-type lower hole 24, the second-type relay hole 7, and the second-type upper hole 34. The first-type waveguides 8 and the second-type waveguides 9 are paths inclined forward in the first-type upper holes 33 and the second-type upper holes 34 provided in the feed member 30. The phrase "inclined forward" in this specification means a posture in which the upper end of something positions at a front side relative to the lower end thereof.

The first-type waveguides 8 each preferably include one end connected to the respective base portions 12 of the first-type horns 11. In addition, the first-type waveguides 8 are open on different receiving ends 41b of the first-type radio frequency circuit 41 at the other end of each of the waveguides. The first-type waveguides 8 guide radar waves received by the first-type horns 11 to the receiving ends 41b.

The second-type waveguides 9 each have one end connected to the respective base portions 22 of the second-type horns 21. In addition, the second-type waveguides 9 are open on different transmitting ends 42b of the second-type radio frequency circuit 42 at the other end of each of the waveguides. The second-type waveguides 9 guide radar waves transmitted from the transmitting ends 42b to the base portions 22 of the second-type horns 21.

The feed portion 5 preferably includes the first-type relay holes 6 of the first-type waveguides 8 and the second-type relay holes 7 of the second-type waveguides 9 between the antenna member 10 and the feed member 30. The first-type relay holes 6 and the second-type relay holes 7 are positioned on a plane (plane parallel to the X-Y plane) in a direction orthogonal or substantially orthogonal to the height direction (Z direction) of the feed portion 5. Accordingly, the first-type relay holes 6 and the second-type relay holes 7 can be formed by elongating the first-type waveguides 8 and the second-type waveguides 9, respectively, in the width direction (X direction) and the length direction (Y direction). Consequently, the openings 33a of the first-type waveguides 8 and the openings 34a of the second-type waveguides 9 can be properly located, according to the configuration of the first circuit board 40. That is, the receiving ends 41b of the first-type radio frequency circuit 41 and the transmitting ends 42b of the second-type radio frequency circuit 42 of the first circuit board 40 are simplified in configuration to achieve cost reductions.

Figure 3:
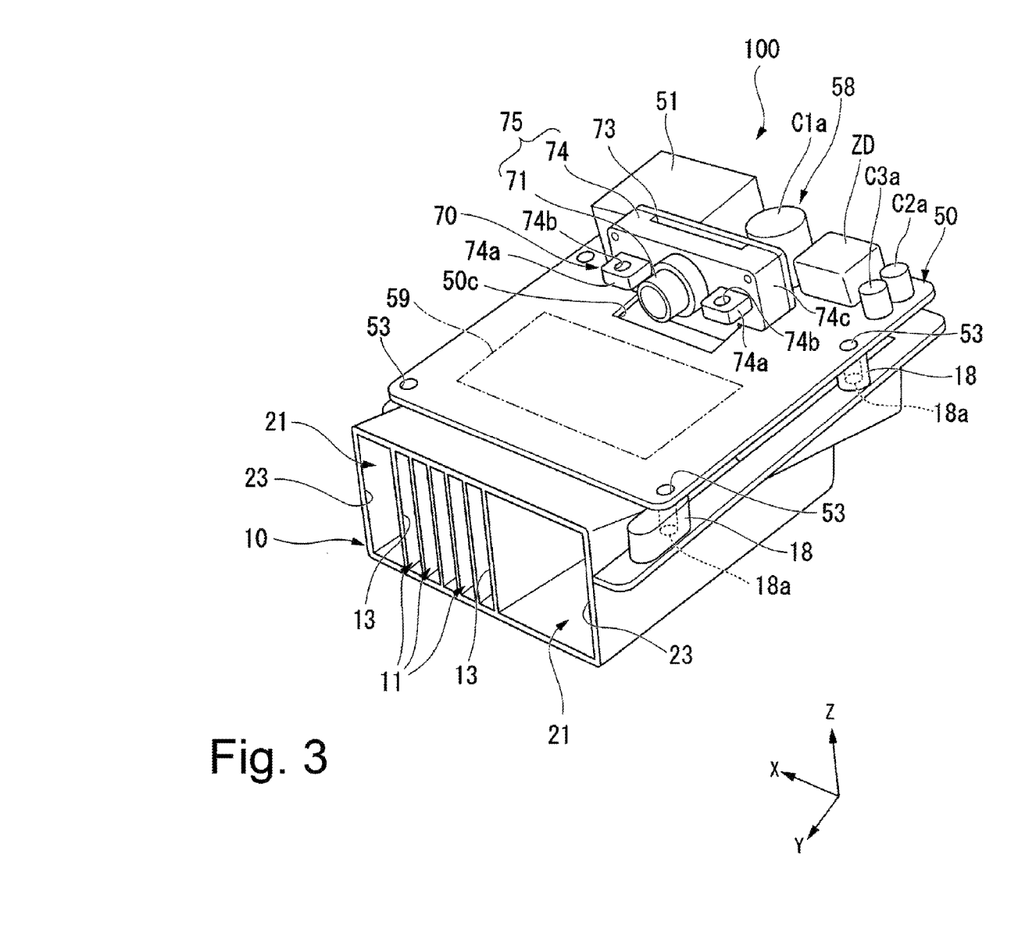
FIG. 3 illustrates a perspective view illustrating a state of the monitoring apparatus in which an upper case and a front cover are removed in the monitoring apparatus of a first preferred embodiment of the present invention.

FIG. 3 is a perspective view illustrating a state of the monitoring apparatus 100 in which the upper case 80 and the front cover 90 are removed.

As illustrated in FIG. 2 and FIG. 3, the monitoring apparatus 100 preferably includes an information-processing circuit 59, the second circuit board 50 including the information-processing circuit 59 thereon, a radio frequency circuit signal line 61 that connects the radio frequency circuits (the first-type radio frequency circuit 41 and the second-type radio frequency circuit 42) to the information-processing circuit 59, an image signal line 60 that connects an image sensor 72 to an information-processing circuit 59, a connector 51 electrically connected to the second circuit board 50, and a power-supply circuit 58 that supplies a DC power to the information-processing circuit 59 and the radio frequency circuits (the first-type radio frequency circuit 41 and the second-type radio frequency circuit 42).

The second circuit board 50 is disposed above the first circuit board 40 and parallel or substantially parallel to the first circuit board 40. The second circuit board 50 is between the upper case 80 and the antenna member 10.

The second circuit board 50 includes the power-supply circuit 58 and the information-processing circuit 59 thereon.

The power-supply circuit 58 supplies direct-current to the information-processing circuit 59, the first-type radio frequency circuit 41 and the second-type radio frequency circuit 42 on the first circuit board 40, and the imaging apparatus 70.

The information-processing circuit 59 is connected to the first-type radio frequency circuit 41 and the second-type radio frequency circuit 42 preferably via the radio frequency circuit signal line 61. The information-processing circuit 59 processes information on radio frequency circuit signals from the first-type radio frequency circuit 41 and the second-type radio frequency circuit 42. More specifically, the information-processing circuit 59 preferably instructs the second-type radio frequency circuit 42, through the radio frequency circuit signal line 61, to transmit radar waves. In addition, the information-processing circuit 59 performs computations, through the radio frequency circuit signal line 61, on information contained in radar waves received at the first-type radio frequency circuit 41 to estimate the distance to an object, the direction of the object, and the like. In addition, the information-processing circuit 59 is connected to the image sensor 72 of the imaging apparatus 70 through the image signal line 60 and the circuit board 73. The information-processing circuit 59 processes image pickup signals from the imaging apparatus 70.

The connector 51 is disposed at a rear side relative to the image-forming optical system 71, in the second circuit board 50.

In addition, the power-supply circuit 58 preferably includes at least one capacitor, and a capacitor C1a that is the highest out of all of the at least one capacitor is disposed at the rear side relative to the image-forming optical system 71, in the second circuit board 50.

Figure 4:
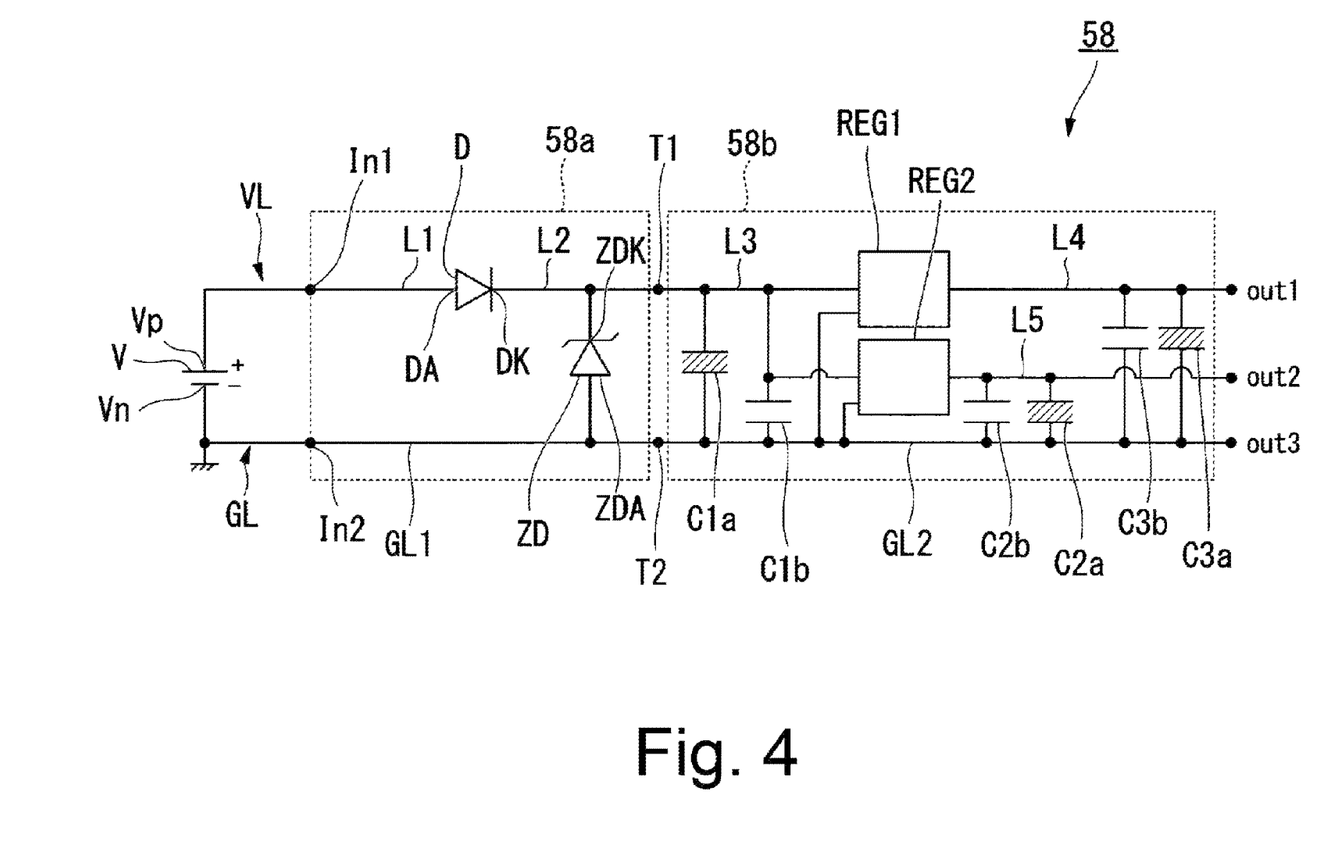
FIG. 4 shows a circuit diagram of a power-supply circuit in a monitoring apparatus according to a preferred embodiment of the present invention.

FIG. 4 illustrates a circuit diagram of the power-supply circuit 58.

As illustrated in FIG. 4, the power-supply circuit 58 preferably includes an input terminal In1, an input terminal In2, a power-supply line VL, a ground line GL, an output terminal out1, an output terminal out2, and an output terminal out3. The power-supply line VL includes a line L1, a line L2, a line L3, a line L4, and a line L5. The ground line GL includes a ground line GL1 and a ground line GL2.

The power-supply circuit 58 preferably further includes a diode D, a Zener diode ZD, a regulator REG1, a regulator REG2, the capacitor C1a, a capacitor C1b, a capacitor C2a, a capacitor C2b, a capacitor C3a, and a capacitor C3b.

The diode D and the Zener diode ZD define a protection circuit 58a. The protection circuit 58a is positioned from the input terminal In1 and the input terminal In2 to the terminal T1 and the terminal T2. The purpose of the protection circuit 58a is to protect the circuit in a case where a positive electrode Vp and a negative electrode Vn of an external power supply V are reversely connected, surge protection, and the like. Note that the reverse connection refers to the state in which the negative electrode Vn of the external power supply V is connected to the input terminal In1 and the positive electrode Vp thereof is connected to the input terminal In2.

The regulator REG1, the regulator REG2, the capacitor C1a, the capacitor C1b, the capacitor C2a, the capacitor C2b, the capacitor C3a, and the capacitor C3b define a power-supply stabilizing circuit 58b. The power-supply stabilizing circuit 58b extends from the terminal T1 and the terminal T2 to the output terminal out1, the output terminal out2, and the output terminal out3. The purpose of the power-supply stabilizing circuit 58b is to significantly reduce or prevent fluctuations in the voltage of a source of an electric power supply and to significantly reduce or prevent the drop of output voltage at the time of instantaneous interruption in the external power supply.

By an external power supply V, 12 VDC, for example, is applied between the power-supply line VL and the ground line GL.

An anode DA of the diode D is connected to the line L1 on the input terminal In1 side, and a cathode DK thereof is connected to the line L2 on the side opposite to the input terminal In1. The diode D allows current to flow from the anode DA to the cathode DK and prevents current from flowing from the cathode DK to the anode DA. The diode D prevents reverse voltage from being applied to the circuitry of a power supply destination in the case where the positive electrode and the negative electrode of the external power supply V are reversely connected.

The Zener diode ZD is connected so as to be reverse-biased between the line L1 and the ground line GL1. A cathode ZDK of the Zener diode ZD is connected to the line L1 side, and an anode ZDA thereof is connected to the ground line GL1 side. The Zener diode ZD allows current to flow from the cathode ZDK to the anode ZDA in the case where the voltage at the cathode ZDK relative to the anode ZDA exceeds the yield voltage of the Zener diode ZD. Accordingly, the Zener diode ZD allows current to flow from the power-supply line VL to the ground line GL side in the case where the voltage between the power-supply line VL and the ground line GL becomes excessively high. The Zener diode ZD thus prevents the application of an excessively high voltage to the power-supply stabilizing circuit 58b in the case where the excessively high voltage is applied from the external power supply V.

The regulator REG1 is provided between the line L3 and the line L4. The regulator REG2 is provided between the line L3 and the line L5.

The regulator REG1 and the regulator REG2 keep voltages to be output constant by subjecting predetermined input voltages to a voltage drop. The regulator REG1 drops a voltage applied from the power-supply line VL and outputs a power supply voltage of, for example, 5 V from the output terminal out1. The regulator REG2 drops a voltage applied from the power-supply line VL and outputs a power supply voltage of, for example, 3.3 V from the output terminal out2.

The capacitor C1a, the capacitor C1b, the capacitor C2a, the capacitor C2b, the capacitor C3a, and the capacitor C3b define and function as power-supply stabilizing capacitors to cause a voltage to be constantly supplied.

In a common power supply, when a large current is consumed momentarily in the circuitry of a power supply destination and a current runs short, fluctuations in voltage occur. The power-supply stabilizing capacitor complements a current that a source of electric power supply lacks so as to stabilize a voltage. While the circuitry of the power supply destination does not need a large current, the power-supply stabilizing capacitor is charged at a normal power supply voltage. If the circuitry of the power supply destination needs a large current, the power-supply stabilizing capacitor discharges accumulated electric charge to stabilize a voltage to be supplied. In addition, at the time of instantaneous interruption of an external power supply, the power-supply stabilizing capacitor maintains the voltage thereof for a certain amount of time by discharging accumulated (electric) charge.

The capacitor C1a, the capacitor C2a, and the capacitor C3a preferably are electrolytic capacitors. In addition, the capacitor C1b, the capacitor C2b, and the capacitor C3b preferably are ceramic capacitors. In the present preferred embodiment, each of the electrolytic capacitors and each of the ceramic capacitor are preferably provided in pairs in parallel. The capacitor C1a and the capacitor C1b are provided in parallel so as to bridge the line L3 and the ground line GL2. The capacitor C2a and the capacitor C2b are provided in parallel so as to bridge the line L5 and the ground line GL2. The capacitor C3a and the capacitor C3b are provided in parallel so as to bridge the line L4 and the ground line GL2.

Electrolytic capacitors are capacitors having relatively large capacitances. Electrolytic capacitors are preferably provided in low-frequency components of fluctuations in a power supply voltage. In contrast, ceramic capacitors are capacitors having relatively small capacitances. Ceramic capacitors are preferably provided in radio frequency components because of their high responsiveness. By providing an electrolytic capacitor and a ceramic capacitor in a pair in parallel, it is possible to prevent fluctuations in voltage over a wide frequency band.

In addition to the above-described diode D, Zener diode ZD, regulator REG1, regulator REG2, capacitor C1a, capacitor C1b, capacitor C2a, capacitor C2b, capacitor C3a, and capacitor C3b, the power-supply circuit 58 of the second circuit board 50 has the connector 51 thereon to which an external terminal is connected (refer to FIG. 3).

As illustrated in FIG. 3, the connector 51, the capacitor C1a, the capacitor C2a, the capacitor C3a, and the Zener diode ZD are components that are large in a height direction as installed components.

As the capacitor C1a, the capacitor C2a, and the capacitor C3a, being electrolytic capacitors, capacitors which have a large height dimension are used in order to ensure sufficient capacities. Among them, in particular, the capacitor C1a provided between the line L3 and the ground line GL2 is necessary to accumulate an (electric) charge corresponding to a potential difference of 12 V so as to prepare for instantaneous interruption in the external power supply. Accordingly, the capacitor C1a is the highest because of the need to have the largest capacitance. As an example, the height of the capacitor C1a is about 10 mm. In addition, as an example, the height of the capacitor C2a and the capacitor C3a is about 8 mm.

As the Zener diode ZD, a capacitor with a large height dimension is used in order to have a sufficient yield voltage. As an example, the height of the Zener diode ZD is about 4 mm.

As an example, the height of the connector 51 is about 12 mm.

The connector 51, the capacitor C1a, the capacitor C2a, the capacitor C3a, and the Zener diode ZD are located on the second circuit board 50 and in a rear side relative to the imaging apparatus 70. As illustrated in FIG. 2, the monitoring apparatus 100 preferably includes the antenna member 10 that is gradually decreasing in height from the front end to the rear end thereof. This means that the tall connector 51, capacitor C1a, capacitor C2a, the capacitor C3a, and Zener diode ZD are located in an area where the height of the antenna member 10 is lower than that at the front end thereof. Accordingly, it is possible to average the height of the monitoring apparatus 100, thus preventing the height from increasing locally.

In addition, locating the connector 51, the capacitor C1a, the capacitor C2a, the capacitor C3a, and the Zener diode ZD backward enables the visual field of the imaging apparatus 70 to not be obstructed by tall components. Accordingly, it is possible to locate the imaging apparatus 70 close to the second circuit board 50. This configuration allows the monitoring apparatus 100 to be small in a height dimension.

As illustrated in FIG. 3, the monitoring apparatus 100 includes the imaging apparatus 70. The imaging apparatus 70 preferably includes an image-forming optical system assembly 75, an image sensor 72, and a circuit board 73. The image-forming optical system assembly 75 includes an image-forming optical system 71 including an optical axis L aimed forward, and a lens holding member 74 that holds the image-forming optical system 71. That is, the monitoring apparatus 100 preferably includes the image-forming optical system 71 aimed forward and the image sensor 72 that is disposed at the focus (i.e., at the focal point) of the image-forming optical system 71.

The optical axis L of the image-forming optical system 71 passes through a visual field window 81 of the upper case 80. The image-forming optical system 71 is preferably configured by, for example, combining a plurality of lenses the optical axes of which are aligned.

The lens holding member 74 is preferably made of, for example, a resin material and the like and includes a main portion 74c that preferably is a rectangular or substantially rectangular section and a pair of flange portions 74a. The lens holding member 74 holds the image-forming optical system 71 in the main portion 74c.

The flange portions 74a project forward from the main portion 74c. The flange portions 74a are each provided with a hole 74b penetrating therethrough in a vertical direction.

The image sensor 72 is disposed at the focus of the image-forming optical system 71. The image sensor 72 is preferably, for example, a solid-state image sensor, such as a CCD image sensor or a CMOS image sensor, and captures subject images formed through the image-forming optical system 71.

The board 73 includes the image sensor 72 there on. The board 73 is fixed together with the lens holding member 74 of the image-forming optical system assembly 75. In addition, the board 73 is connected to the second circuit board 50 using an image signal line 60.

The imaging apparatus 70 is controlled by the control circuit of the second circuit board 50 and supplied with power from the second circuit board 50.

As illustrated in FIG. 1, the monitoring apparatus 100 is positioned above the antenna member 10 and including an upper case that includes a flat portion (a front upper surface 83).

The upper case 80 includes a rear upper surface 82 and a front upper surface (flat portion) 83 positioned on the upper side of the case, a pair of side surfaces 84 positioned on the lateral sides, and a rear surface 85 positioned on the back side.

The upper case 80 is preferably screw-fixed together with the antenna member 10 but may be attached in other ways and by other fixing elements or materials.

The upper case 80 includes an opening 87 on the front side thereof. The apertures 13 of the first-type horns 11 and the apertures 13 of the second-type horns 21 of the antenna member 10 are exposed forward from the opening 87. The front cover 90 is provided in the opening 87 to cover the apertures 13 and the apertures 23.

As illustrated in FIG. 2, the rear upper surface 82 is preferably positioned one step above the front upper surface 83 with a step 86 therebetween. The imaging apparatus 70 and the connector 51, the capacitor C1a, the capacitor C2a, the capacitor C3a, and the Zener diode ZD mounted on the second circuit board 50 are disposed below the rear upper surface 82.

The upper case 80 includes, in the middle or backward of the front upper surface (flat portion) 83, the visual field window 81 that is a notch or a hole. The optical axis L of the image-forming optical system 71 passes through the visual field window 81. In the present preferred embodiment, the visual field window 81 is provided at the center of the step 86 of the upper case 80 in a width direction. The visual field window 81 secures the visual field of the imaging apparatus 70. A transparent plate may be fitted in the visual field window 81.

The front upper surface (flat portion) 83 of the upper case is inclined in a direction in which the front upper surface approaches the central axis of the main lobe of the antenna member 10 as the flat portion approaches to the front end of the upper case 80. The front upper surface (flat portion) 83 is positioned below the visual field of the image-forming optical system 71.

The front upper surface 83 covers the downside of the visual field of the imaging apparatus 70, thus blocking light traveling toward the imaging apparatus 70 from below the monitoring apparatus 100 and preventing the light from entering the image-forming optical system 71.

As illustrated in FIG. 2, the monitoring apparatus 100 further includes a front cover (cover) 90 that is a resin-made plate member disposed in front of the antenna member 10.

The front cover 90 is fitted in an opening 87 of the upper case 80, covering the apertures 13 of the first-type horns 11 and the apertures 23 of the second-type horn 21. The front cover 90 is preferably a plate that has a square or substantially square shape in a front view and a constant thickness.

Figure 6:
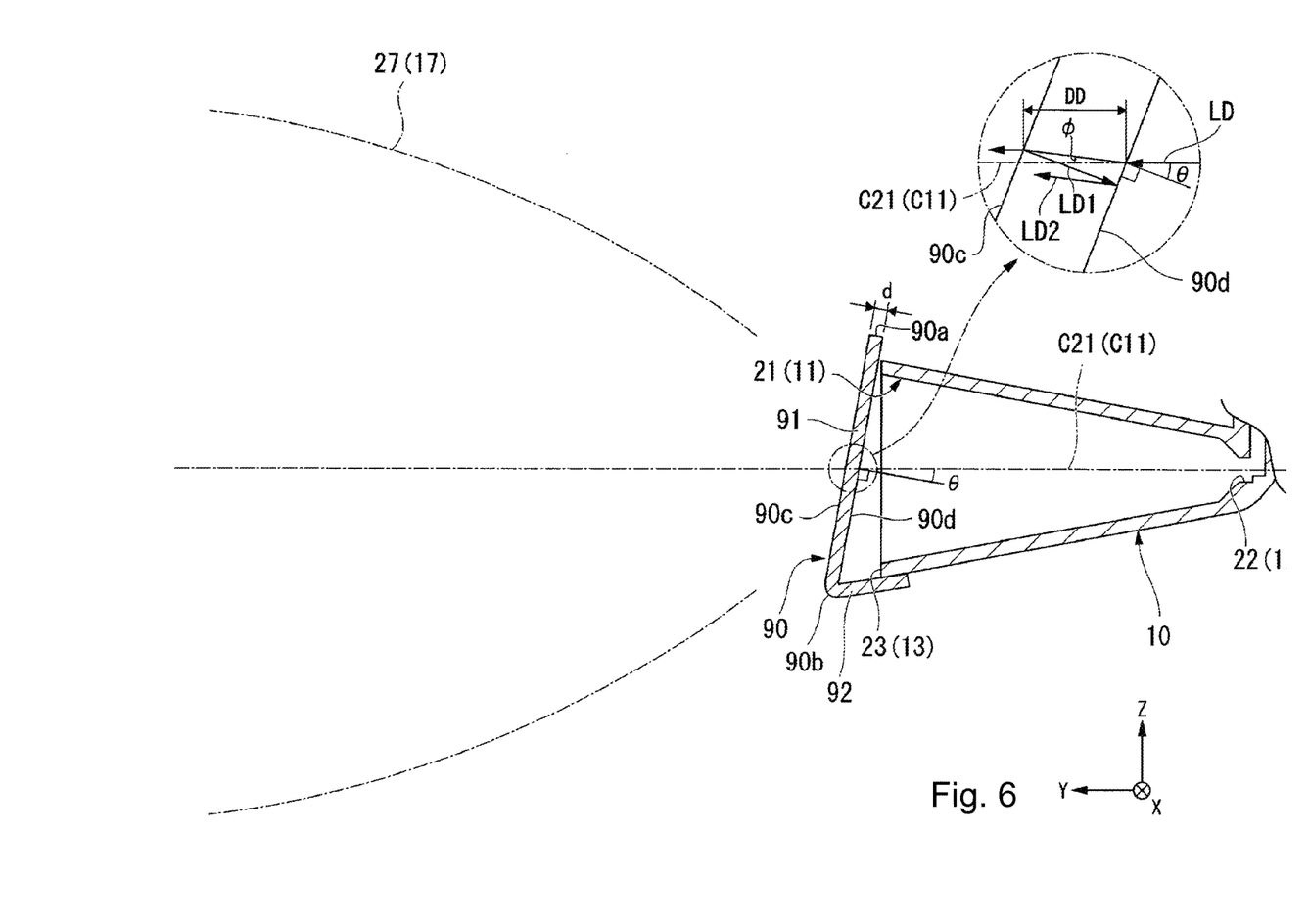
FIG. 6 shows a schematic cross-sectional view illustrating the relationship between a first-type horn or a second-type horn and a front cover in a monitoring apparatus according to a preferred embodiment of the present invention.

FIG. 6 is a schematic cross-sectional view illustrating the relationship between the main lobe 17 of the first-type horn 11 or the main lobe 27 of the second-type horn 21 of the antenna member 10 and the front cover 90.

Note that the relationship between the second-type horn 21 and the front cover 90 will be described here, but the first-type horn 11 and the front cover 90 have the same relationship.

The front cover 90 preferably includes a front portion 91 and a lower-surface portion 92.

The front portion 91 is disposed facing the apertures 13 of the first-type horns 11 and the apertures 23 of the second-type horns 21. The front portion 91 is inclined such that the lower side thereof recedes backward with respect to the apertures 13 and the apertures 23. That is, in the direction of a central axis C21 of the main lobe 27 of the second-type horn 21, the lower edge 90b of the front cover 90 is positioned at the front side relative to the upper edge 90a. Likewise, in a direction of a central axis C11 of the main lobe 17 of the first-type horn 11, the lower edge 90b of the front cover 90 is positioned at the front side relative to the upper edge 90a.

The lower-surface portion 92 extends to the antenna member side at the lower edge 90b of the front cover 90, covering a portion of the lower surface of the antenna member 10. The lower-surface portion 92 closes gaps between the lower edge 90b of the front cover 90, and the apertures 13 and the apertures 23.

For the front cover 90, it is preferable that the following Formula 1 is satisfied.

Note that d denotes the thickness of the front cover 90;

ε denotes a relative dielectric constant of a resin material that defines the front cover 90;

θ denotes an angle defined by the central axis C21 of the main lobe 27 and the normal to the surface of the front cover 90 (a front surface 90c or a back surface 90d);

λ denotes a wavelength of electromagnetic waves (radar waves), in vacuum, at a frequency at which the second-type radio frequency circuit 42 oscillates (i.e., a frequency at which the first-type radio frequency circuit 41 performs receiving); and m is a natural number.

$$\frac{\sqrt{\varepsilon}\, d}{\lambda \cos\left(\sin^{-1}\left(\frac{\sin\theta}{\sqrt{\varepsilon}}\right)\right)} = \frac{1}{2}\left(m \pm \frac{1}{4}\right) \quad \text{Formula 1}$$

The deriving process of Formula 1 will be described.

As illustrated in FIG. 6, a radar wave LD enters inside the front cover 90 from the back surface 90d of the front cover 90 and is emitted forward through the front surface 90c of the front cover 90. The direction of travel of the radar wave LD inside the front cover 90 is refracted upward by φ given by the following Formula 2 with respect to the central axis C21 of the main lobe 27.

$$\phi = \sin^{-1}\left(\frac{\sin\theta}{\sqrt{\varepsilon}}\right) \quad \text{Formula 2}$$

In addition, a distance of travel DD of the radar wave LD, inside the front cover 90, that travels from the back surface 90d of the front cover 90 and reaches the front surface 90c can be expressed using φ as the following Formula 3.

$$D = \frac{d}{\cos\phi} \quad \text{Formula 3}$$

When the radar wave LD travels inside the front cover 90 to reach the front surface 90c of the front cover, the radar wave LD refracts again and is emitted forward. In addition, a portion of the radar wave LD is reflected at the front surface 90c as a reflected wave LD1 that reflects off the front surface 90c of the front cover and travels backward. The first reflected wave LD1 travels backward inside the front cover 90, reaching the back surface 90d of the front cover 90 to reflect again. This a second reflected wave LD2 travels forward. The distance of travel of the first reflected wave LD1, inside the front cover 90, that reaches the back surface 90d from the front surface 90c is the same to the distance of travel DD of the radar wave LD.

The second reflected wave LD2 may partially cancel out the radar wave LD incident on the back surface 90d of the front cover 90 to weaken the radar wave LD. For this reason, the front cover 90 preferably has the thickness d and the angle θ such that the radar wave LD and the second reflected wave LD2 do not cancel out each other.

To prevent the cancelling, it is preferable that the phase of the radar wave LD incident on the back surface 90d is shifted by a half wavelength from the phase of the second reflected wave LD2 that reaches the back surface 90d and reflects again. The phase of the second reflected wave LD2 is shifted from the phase of the radar wave LD incident from the back surface 90d by a phase made by traveling the distance of travel DD and back. In addition, the wavelength of the radar wave LD, the first reflected wave LD1, and the second reflected wave LD2 inside the front cover 90 is expressed by λ/√ε.

This means that the satisfaction of Formula 1 allows a radar wave to be emitted forward without being weakened.

That is, it is possible to significantly reduce or prevent turbulences in waveform while significantly reducing or preventing the reflection loss of the radar wave LD in the case where the front cover 90 is disposed on the front surface of the antenna member 10.

The case where the front cover 90 of made of an ABS resin (Acrylonitrile butadiene styrene) is explained below as a non-limiting example. When the frequency of the radar wave is 76 GHz, the wavelength λ of the radar wave is λ=3.92 mm. The relative dielectric constant ε in a frequency band of 76 GHz is ε=2.67. The angle θ formed by the normal to the surface of the front cover 90 and the central axis C21 of the main lobe 27 is provisionally set as θ=10 degrees. At this point, d is preferably made 1.2 mm (m=1).

Note that, as the relative dielectric constant ε of a resin material constituting the front cover 90, a value at a frequency generated by the second-type radio frequency circuit 42 is used.

Figure 5:
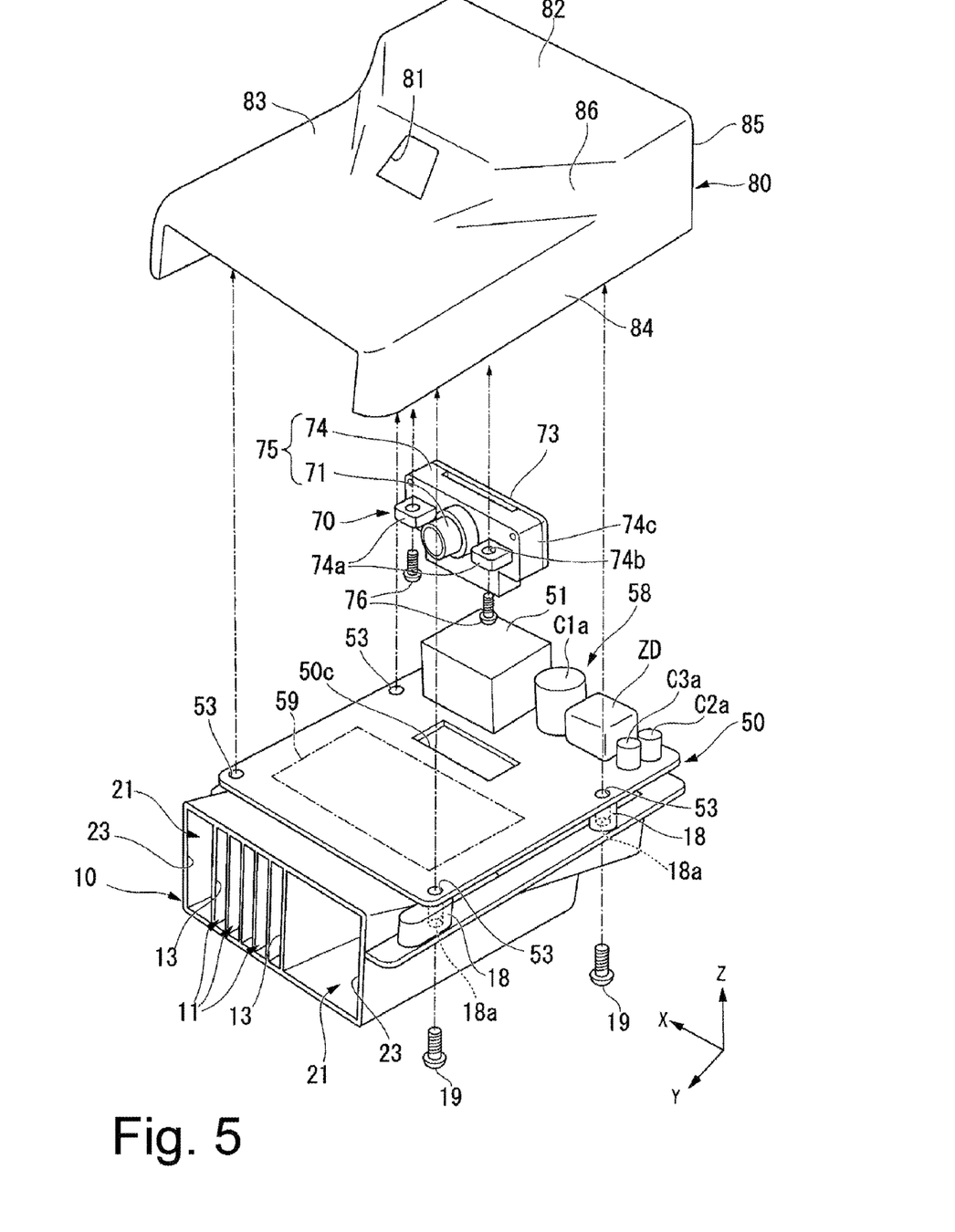
FIG. 5 illustrates an exploded view of a monitoring apparatus according to a preferred embodiment of the present invention.

The antenna member 10 preferably includes four bosses 18 extending in a vertical direction. The bosses 18 are each provided with a through hole 18a penetrating in the vertical direction.

The second circuit board 50 is installed on the upper surfaces of the bosses 18 of the antenna member 10. In addition, the second circuit board 50 is preferably provided with four fixing holes 53. The four fixing holes 53 are provided at the same positions as the through holes 18a provided in the bosses 18 as viewed in plan. Fixing screws 19 are inserted into the fixing holes 53 of the second circuit board 50 and the through holes 18a of the bosses 18 of the antenna member 10. The fixing screws 19 are inserted into screw holes (not illustrated) that are provided on the lower surface of the upper case 80. The second circuit board 50 is sandwiched between the lower surface of the upper case 80 and the bosses 18 of the antenna member 10. The antenna member 10 is thus fixed.

Fixing screws 76 penetrate the holes 74b of the flange portions 74a that are provided in the lens holding member 74 of the imaging apparatus 70. The fixing screws 76 are inserted into screw holes (not illustrated) provided on the lower surface of the upper case 80. The imaging apparatus 70 is thus fixed to the upper case 80.

The use of such an assembly structure fixes the image-forming optical system 71 and the antenna member 10 to the upper case 80. That is, the image-forming optical system 71 and the antenna member 10 are fixed with reference to the upper case 80. Accordingly, the relationship between the orientation of the antennas (the first-type horns 11 and the second-type horns 21) and the orientation of the image-forming optical system 71 is easily kept constant during mass production.

Figure 7:
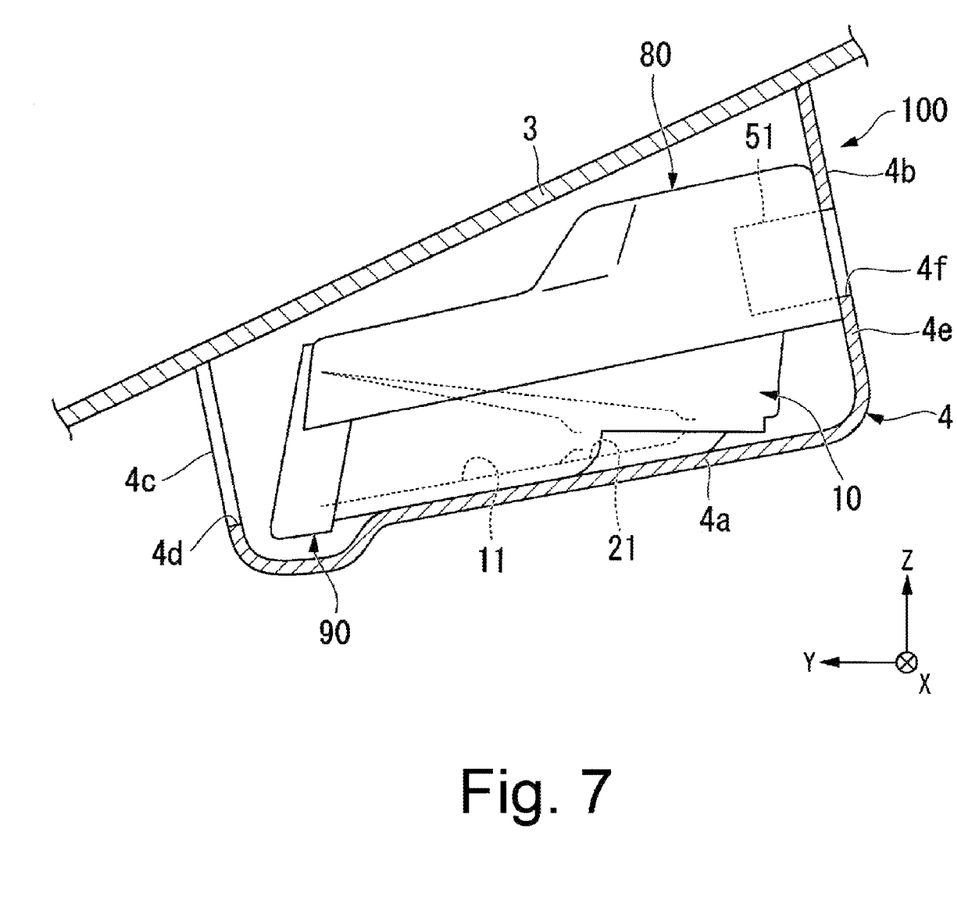
FIG. 7 illustrates a monitoring apparatus according to a preferred embodiment of the present invention including a lower case.

FIG. 7 is a diagram illustrating the monitoring apparatus 100 in the state of being installed in the internal space of a vehicle.

As illustrated in FIG. 7, the monitoring apparatus 100 may include a lower case 4. The lower case 4 covers the lower surface 10b of the antenna member 10. In addition, the lower case 4 surrounds and houses the monitoring apparatus 100 while being fixed to a windshield 3 to support the monitoring apparatus 100.

The lower case 4 preferably includes a bottom surface portion 4a and a surrounding wall 4b. The antenna member 10 is installed and fixed to the bottom surface portion 4a. The surrounding wall 4b extends upward from the bottom surface portion 4a, covering all sides of the apparatus housed in the inside thereof. The surrounding wall 4b is fixed to the windshield 3 at the upper end thereof. An opening 4d is provided on a front wall 4c of the surrounding wall 4b that is positioned in front of the monitoring apparatus 100. The opening 4d significantly reduces or prevents turbulences of radar waves radiated from the antenna member 10. A hole 4f that connects an external terminal to the connector 51 is provided on a back wall 4e of the surrounding wall 4b that is positioned backward of the monitoring apparatus 100.

The lower case 4 provides a designer of the monitoring apparatus 100 with a freedom to choose a design of the bottom of the monitoring apparatus 100. In addition, the lower case 4 protects the monitoring apparatus 100.

As described above, according to the present preferred embodiment, the downsized monitoring apparatus 100 is achieved.

The monitoring apparatus 100 may be installed in the interior space of an automobile in some cases, for example. Specifically, the monitoring apparatus 100 may be located between a windshield and a rearview mirror in the interior of a vehicle with the front side of the apparatus directed at the windshield. If the monitoring apparatus 100 has too large of a height (dimension in the Z-axis direction) in this case, the monitoring apparatus 100 may hinder the vision of a driver who drives the vehicle. If the monitoring apparatus 100 is too large in width (dimension in the X-axis direction) and length (dimension in the Y-axis direction), the monitoring apparatus 100 may be largely exposed from the back side of the rearview mirror, which most consumers may feel to be unsightly.

Since all of the five first-type horns 11 and the two second-type horns 21 are aligned in the width direction of the apparatus, the monitoring apparatus 100 of the present preferred embodiment is able to significantly reduce the height dimension. Accordingly, it is possible to prevent the monitoring apparatus 100 from hindering the vision of a driver when the monitoring apparatus 100 is installed in the interior space of a vehicle.

In addition, in the monitoring apparatus 100, the plurality of first-type horns 11 are disposed side by side, and the second-type horns 21 are not disposed between the first-type horns 11. That is, in the monitoring apparatus 100, the plurality of first-type horns 11 are disposed in a concentrated manner. In the first-type radio frequency circuit 41, the plurality of receiving ends 41b are preferably disposed in a concentrated manner in terms of efficiency. Disposing the plurality of first-type horns 11 in a concentrated manner allows the horns of the monitoring apparatus 100 to be densely opened on the first-type radio frequency circuit 41, without complicating the first-type waveguide 8 connected to each base portion 12.

In addition, in the monitoring apparatus 100, the apertures 13 of the first-type horns 11 and the apertures 23 of the second-type horns 21 are preferably flush with one another in a front-back direction. This allows the front surface of the monitoring apparatus 100 to be linearly configured, enabling the monitoring apparatus 100 to be disposed along the windshield of a vehicle. This allows the monitoring apparatus 100 to be close to the windshield, enabling the space inside the vehicle to be efficiently used.

The upper surface 30a and the lower surface 30b of the feed member 30 of the monitoring apparatus 100 are not parallel to each other, and the upper surface 30a is inclined in a direction in which the upper surface 30a descends as the upper surface 30a approaches to the front end of the feed member 30. As a result, the first circuit board 40 fixed on the upper surface 30a of the feed member 30 is also inclined in the same manner. The surface of the first circuit board 40 extends in the width and height directions of the first-type horns 11.

In the monitoring apparatus 100, the second circuit board 50 is disposed above the first circuit board 40. The first circuit board 40 and the second circuit board 50 are preferably disposed parallel to each other. This allows the monitoring apparatus 100 to be provided with a given gap between the first circuit board 40 and the second circuit board 50, preventing mechanical interference between both of the circuit boards, and making both of the circuit boards unsusceptible to the influence of the electromagnetic fields from both.

The second circuit board 50 is preferably parallel to the first circuit board 40 and is therefore inclined forward along the first circuit board 40. Consequently, the monitoring apparatus 100 allows the second circuit board 50 to be disposed close to the antenna member 10 on the front side of the apparatus, thus significantly reducing the front-side height dimension. In addition, in the monitoring apparatus 100, the front upper surface 83 of the upper case 80 is disposed along and parallel to the second circuit board 50 to significantly reduce the front-side height dimension of the monitoring apparatus 100 and cause the front upper surface 83 to be inclined forward. Consequently, the monitoring apparatus 100 allows the visual field of the imaging apparatus 70 to be broadened downward.

Having thus described various preferred embodiments of the present invention, constituent elements, combinations thereof, and the like in the various preferred embodiments are illustrative only. Accordingly, configurational additions, omissions, substitutions, and other modifications are possible without departing from the gist of the present invention.

For example, a monitoring apparatus provided with five first-type horns has been described by way of example in the preferred embodiments above. The preferred embodiments are not limited to such a monitoring apparatus, however. Preferably, the monitoring apparatus is provided with three or more first-type horns, for example.

In addition, a monitoring apparatus in which one each of second-type horns is disposed on the left and right of a row of first-type horns has been described by way of example in the preferred embodiments described above. At least one second-type horn may be positioned at the leftmost or rightmost end of the row of first-type horns, however. For example, two second-type horns may be disposed at the rightmost end of the row. Alternatively, each preferred embodiment may be provided with at least one second-type horn, and therefore, the number of horns does not matter.

Yet additionally, in the above-described preferred embodiments of the present invention, the apertures of two second-type horns preferably are level with each other. The apertures of a plurality of second-type horns may differ in height, however.

In addition, in the above-described preferred embodiments of the present invention, the antenna member preferably includes the first-type horns and the second-type horns but is not limited to this. The antenna member may be any directional antenna and may be, for example, an antenna array.

In addition, in the above-described preferred embodiments of the present invention, the optical axis of the image-forming optical system of the imaging apparatus directly passes through the visual field window of the upper case. However, the imaging apparatus may be of a form that includes a prism that changes the direction of the optical axis of the image-forming optical system, where the direction of the optical axis is bent by the prism disposed in the visual field window to lead light to a lens directed in the other direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A monitoring apparatus comprising:
   an image-forming optical system aimed in a first direction;
   an image sensor positioned at a focal point of the image-forming optical system;
   an antenna member including an antenna with a main lobe that extends in the first direction, the main lobe being a radiating pattern of the antenna member;
   a radio frequency circuit;
   a first circuit board including the radio frequency circuit thereon;
   a waveguide connecting an output end of the radio frequency circuit and the antenna;
   an upper case positioned at a first side in a second direction of the antenna member, the second direction being different from the first direction, the upper case including a flat portion;
   an information-processing circuit;
   a second circuit board including the information-processing circuit thereon;
   a radio frequency circuit signal line connecting the radio frequency circuit to the information-processing circuit;
   an image signal line connecting the image sensor to the information-processing circuit;
   a connector electrically connected to the second circuit board;
   a power-supply circuit providing DC power to the information-processing circuit and the radio frequency circuit; and
   a cover including a plate member made of resin disposed at a first side in the first direction to the antenna member; wherein
   the flat portion of the upper case is inclined in a direction in which the flat portion of the upper case is closer to a central axis of the main lobe of the antenna member at the first side in the first direction than at a second side in the first direction of the flat portion of the upper case;
   the second circuit board is positioned between the upper case and the antenna member;
   the upper case includes, in a middle of the flat portion, a visual field window that includes a notch or a hole;
   an optical axis of the image-forming optical system passes through the visual field window;
   the image-forming optical system is fixed to the upper case;
   the flat portion is positioned at a second side in the second direction with respect to a visual field of the image-forming optical system;
   the connector is positioned at the second side in the first direction relative to the image-forming optical system;
   the power-supply circuit includes at least one capacitor;
   the cover has a constant thickness and has a square or substantially square shape in a view from the first side in the first direction; and
   Formula 1 is satisfied, $$\frac{\sqrt{\varepsilon}\,d}{\lambda \cos\left(\sin^{-1}\left(\frac{\sin\theta}{\sqrt{\varepsilon}}\right)\right)} = \frac{1}{2}\left(m \pm \frac{1}{4}\right) \qquad \text{Formula 1}$$

with d being a thickness of the cover, ε being a relative dielectric constant of a resin material constituting the cover, θ being an angle defined by a central axis of the main lobe and a normal to a surface of the cover, λ being a wavelength of an electromagnetic wave in vacuum at a frequency the radio frequency circuit outputs, and m being a natural number.

2. The monitoring apparatus of claim 1, wherein
   the antenna member is directly fixed to the upper case; and
   the waveguide and the first circuit board are directly fixed to the antenna member.

3. The monitoring apparatus of claim 1, further comprising a lower case covering a surface of the antenna member at the second side in the second direction.

4. The monitoring apparatus of claim 2, further comprising a lower case covering a lower surface of the antenna member at the second side in the second direction.

* * * * *